March 22, 1938.  W. ESPE  2,112,082
METHOD FOR IMPROVING THE VACUUM OF DISCHARGE APPARATUS
Filed Nov. 23, 1936
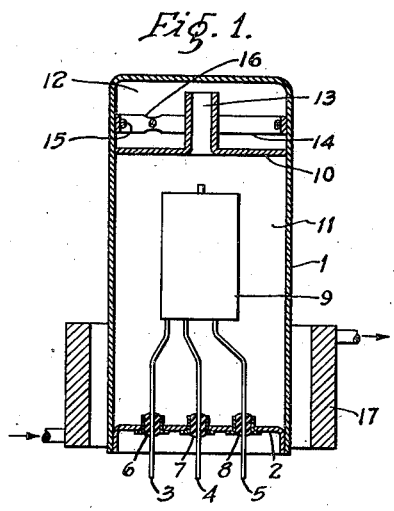
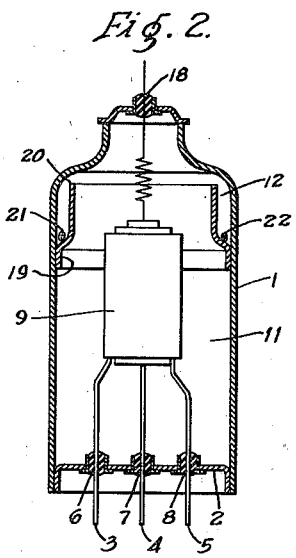
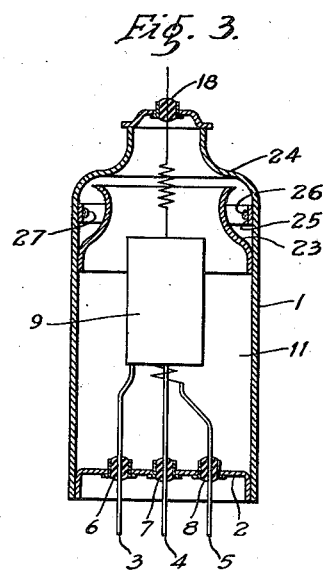
WITNESSES:
Michael Stark
R W Bailey
INVENTOR
Werner Espe.
BY F. W. Lyle
ATTORNEY Patented Mar. 22, 1938

2,112,082

UNITED STATES PATENT OFFICE 2,112,082

METHOD FOR IMPROVING THE VACUUM OF DISCHARGE APPARATUS

Werner Espe, Berlin-Siemensstadt, Germany, assignor to Siemens & Halske, Aktiengesellschaft, Siemensstadt, near Berlin, Germany, a corporation of Germany Application November 23, 1936, Serial No. 112,373
In Germany November 23, 1935

7 Claims. (Cl. 250—27.5)

My invention relates to a method for improving the vacuum of discharge apparatus by evaporating therein a getter substance.

It is well known in the art to improve the vacuum in discharge apparatus by evaporating therein a getter substance, such as, for instance, magnesium. If this known method is to be applied to metal vacuum tubes which since recently have been in extensive use great difficulties are encountered, since it is rather difficult to attain even in the interior the temperature necessary for evaporating the getter substance without damaging the vacuum tubes. The well-known method of heating by eddy currents fails in the majority of cases, since the total eddy current energy is taken up by the tube walls having the usual wall thickness. The object of my invention is to eliminate these drawbacks.

To improve the vacuum of vacuum tubes having at least in part metallic walls by evaporating therein a getter substance, the wall of the tube is made according to the invention of a substance of small permeability and a cylindrical or circular body consisting of a material of high permeability is arranged within the wall in the immediate neighborhood of the same.

The invention is based upon the following recognition. The depth of penetration $l_0$ of the eddy currents is computated according to the following formula:

$$l_0 = 500\sqrt{\frac{\rho_t}{f \times \mu}}$$

where $\mu$ is the permeability, $f$ the frequency of the alternating field and $\rho_t$ the specific resistance. The eddy currents must penetrate the outer wall of the tube to a considerable depth in order that the eddy current energy is not taken up by the outer wall so as to unnecessarily heat the latter, whereas only a small amount of heat is supplied to the getter substance. The depth of penetration of the eddy currents must be small for the cylindrical body arranged within the walls and carrying the getter substance to be evaporated. The extent to which the eddy current penetrates the walls depends essentially upon the permeability $\mu$, whereas the influence of the specific resistance $\rho_t$ which has a very low numerical value as compared to the permeability is not so important. The depth of penetration of the eddy currents and, therefore, the heat conditions may be controlled by the choice of the permeability and the walls of the tube are made according to the invention of a material of low permeability and the circular body carrying the getter pill of a material of high permeability. Furthermore, it is advantageous not to choose too high a frequency for the alternating field producing the eddy currents.

In the accompanying drawing are shown some embodiments of my invention in diagrammatic form.

In Fig. 1, I denotes the metallic envelope of the discharge tube closed at the lower end thereof by a bottom 2 in which are provided the insulating bushings 6, 7 and 8 through which pass the leads 3, 4 and 5. 9 denotes the electrode system. The inner space of the discharge vessel is divided by a part 10 consisting of metal or insulating material into a lower space 11 in which is placed the electrode system and an upper space 12 in which the getter substance evaporates, both spaces being in communication through the aperture 13. A ring 14 consisting of a material of high permeability is arranged within the space 12 and carries the getter substance as indicated at 15. The getter substance may be either arranged over the entire periphery or at different points of the ring. It is preferable in order to increase the heat to provide the ring 14 with a notch as indicated at 16 so as to cause a greater development of heat in the cross-section thus reduced.

To prevent an overheating of the seals arranged in the bottom plate 2 during the evaporation of the getter substance it is preferable to cool the lower part of the tube by any known cooling device such as shown at 17.

Fig. 2 shows another embodiment of my invention in which the space for the evaporation of the getter substance is also so arranged that only a small amount of the metallic vapors produced may pass into the discharge space and deposit on the insulating parts arranged therein. In the bottom plate 2 of the discharge tube I are arranged the insulating bushings 6, 7 and 8 through which pass the leads 3, 4 and 5. 9 is the electrode system. Another lead passes through a bushing arranged in the upper part of the tube as indicated at 18. The space 12 in which the evaporation occurs communicating with the discharge space 11 is formed in the manner that inside the tube a sleeve-shaped part 19 is so arranged as to leave a clearance as indicated at 20. 21, 22 denote the getter substance to be evaporated. The sleeve-shaped ring 19 is made according to the invention of a material of high permeability.

Another form of my invention is shown in Fig. 3. Within the metallic envelope I there is a ring 23 which is so arranged as to leave a clearance as indicated at 24. Here as in the case of the embodiment shown in Fig. 1 a ring 25 is arranged for the production of heat consisting of a material of high permeability and of low specific resistance $\rho_t$ which carries the getter substance 26, 27 and is in heat contact with the wall of the tube 1 and may as shown also in Fig. 1 be provided with notches for increasing the production of heat at the points to which the getter substance is applied.

Further, it may be convenient to place the getter substance between the inner wall of the discharge tube and the outer wall of the short-circuit ring.

Finally it is also possible to manufacture the discharge tube 1 of two different metals, one of which forming the outer wall consists of a metal of low permeability and high specific resistance $\rho_t$ and the other forming the inner wall consists of a metal of high permeability and low specific resistance $\rho_t$.

I claim as my invention:

1. An electric discharge apparatus having at least two electrodes, comprising metallic walls, a closure through which the electrode leads pass, a closed metallic ring arranged within said walls and adapted to carry a getter substance to be evaporated, the magnetic permeability of said walls being small compared to the permeability of said ring.

2. An electric discharge apparatus having at least two electrodes, comprising a metallic envelope, a closure through which the electrode leads pass, a closed metallic ring so arranged as to carry a getter substance to be evaporated, a shield plate arranged between the space containing said electrodes and said ring, the magnetic permeability of said envelope being small compared to the permeability of said ring.

3. An electric discharge apparatus comprising metallic walls, a closure through which the electrode leads pass, a closed metallic ring adapted to carry the getter substance to be evaporated, a shield adapted to prevent the getter substance from reaching the space containing the electrodes when evaporating, the cross-section of said ring being restricted at those points to which the getter substance is applied, the magnetic permeability of said walls being small compared to the permeability of said ring.

4. An electric discharge apparatus having at least two electrodes, comprising metallic walls, a ring coaxially arranged with respect to said walls having a part of its length lying close to the walls of the discharge apparatus, the other part of the ring being narrowed in diameter and forming with the wall of the discharge apparatus a hollow space for the reception of a getter substance, the magnetic permeability of said walls being small compared to the permeability of said ring.

5. An electric discharge apparatus having at least two electrodes, comprising metallic walls, a closure through which the electrode leads pass, a ring adapted to screen the space containing said electrodes against the space in which the getter substance evaporates, said ring leaving a clearance between the evaporation chamber and the chamber containing the electrodes, the magnetic permeability of said walls being small compared to the permeability of said ring.

6. An electric discharge apparatus having at least two electrodes, comprising metallic walls, a closure, a closed ring adapted to carry a getter substance to be evaporated between the inner wall of the discharge tube and the outer wall of said ring, the magnetic permeability of said walls being small compared to the permeability of said ring.

7. An electric discharge apparatus having at least two electrodes, comprising metallic walls, a closure through which the electrode leads pass, a closed metallic ring adapted to carry a getter substance to be evaporated, a shield adapted to prevent the getter substance to be evaporated from reaching the space containing the electrodes, the magnetic permeability of said walls being small compared to the permeability of said ring, said walls being made of two different metals.

WERNER ESPE.